Oct. 27, 1964  B. J. OTTEN  3,154,776
DUAL ROTATING LIGHT SIGNAL HAVING CENTRIFUGAL
OPERATION OF LIGHT SWITCHES
Filed Sept. 5, 1962
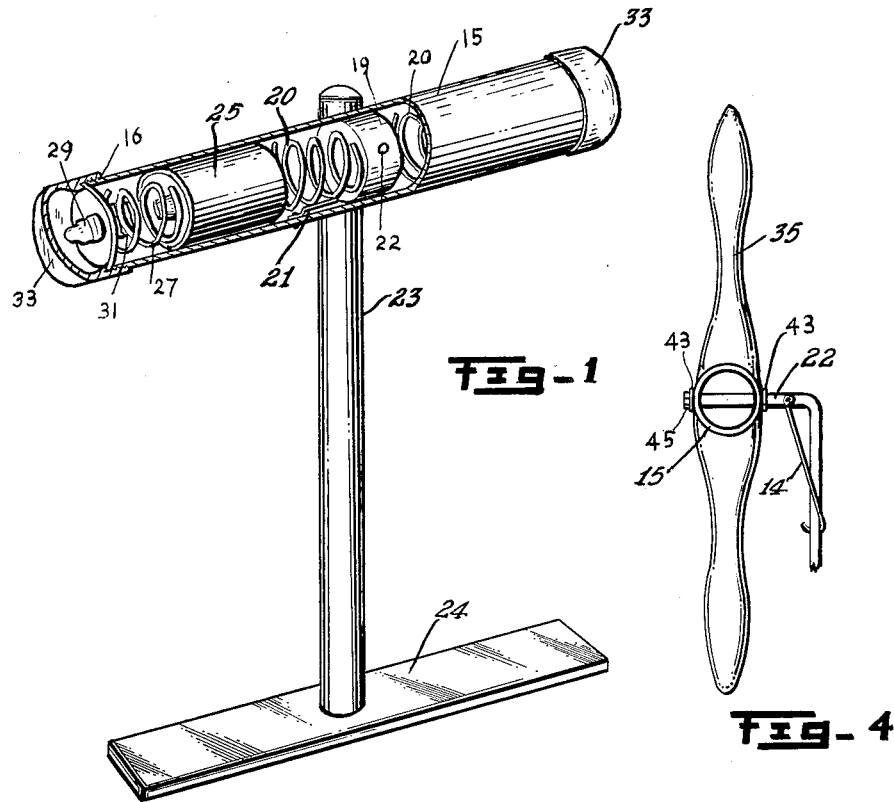
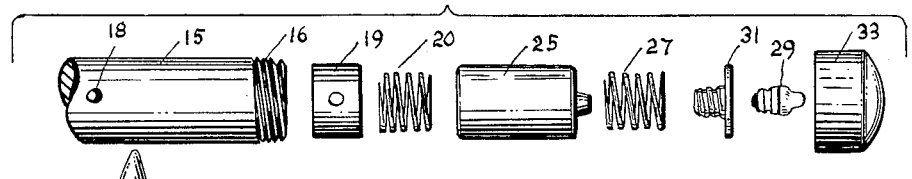
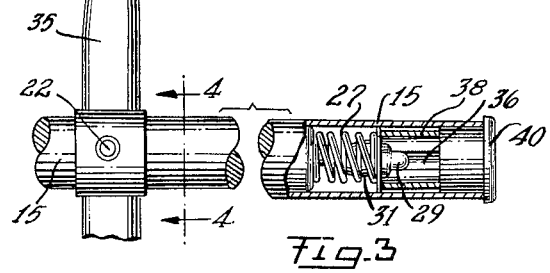
BERNARD J. OTTEN.
INVENTOR.
BY

United States Patent Office 3,154,776
Patented Oct. 27, 1964

3,154,776
DUAL ROTATING LIGHT SIGNAL HAVING CENTRIFUGAL OPERATION OF LIGHT SWITCHES
Bernard J. Otten, La Mesa, Calif.
(14212 Red Hill Ave., Santa Ana, Calif.)
Filed Sept. 5, 1962, Ser. No. 221,583
15 Claims. (Cl. 340—321)

This invention relates generally to a new electro-mechanical device wherein rotation of a housing causes components within the housing to move in such a manner that an electrical circuit, or circuits, is completed, or broken, thereby causing electrical lamps within the housing to illuminate, or to cease illuminating.

Heretofore other devices have been used to accomplish similar objectives; however, none of the other devices utilize the combination of forces and principles presented herein.

A primary object of the present invention is to provide a toy wherein a child, by rotating or whirling a housing about its own axis, can cause electric lamps, visible within the housing, to illuminate, thereby presenting a circle, or concentric circles, of light, and to remain illuminated until the speed of rotation decreases.

Another object of the present invention is to provide a dual rotating light signal for use on bicycles or other vehicles wherein the rotary motion required for lamp illumination results from the motion of air, or other fluid, relative to the moving vehicle or from a mechanical connection between the wheels or drive mechanism of the vehicle and the signal device.

A further object of the present invention is to provide an electro-mechanical device wherein the rotational speed, or speeds, at which an electrical circuit, or circuits, will be completed, or broken, can be pre-determined and wherein this pre-determination then can be used to detect when the velocity of air, or other fluid, reaches a certain pre-selected value, or values.

Another object of the present invention is to provide an electro-mechanical device which, when attached to a rotating object, will detect when the speed of the object reaches a pre-selected value, or values.

Still another object of the present invention is to provide an electro-mechanical device which can be adjusted or calibrated so that the device will be capable of detecting pre-selected speeds within a broad range of such speeds.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view, partially in cross-section, of the invention as a toy;

FIGURE 2 is an exploded view of a portion of the housing and its contents shown in FIGURE 1;

FIGURE 3 is a view, partially in cross-section, of an alternate embodiment of the invention, a dual rotating light signal;

FIGURE 4 is a cross-sectional view through axis 4—4 of FIGURE 3.

Referring now to FIGURE 1 of the drawings, 15 is an electrically conductive housing the interior of which is in the form of a hollow tube open at both ends, externally threaded, 16, at both ends, and with a cylindrical spacer block 19 within the housing midway between its two ends. A shaft 22 passes through the housing and spacer block and into an upright standard 23 which is fastened to a base 24. The housing is free to rotate about the shaft.

The cross-sectional view of FIGURE 1 shows the arrangement of components within the housing on one side of the spacer block 19 only. The components and arrangement thereof on the other side of the spacer block is identical to that shown.

Outboard of the spacer block 19, of FIGURE 1, there are, in order, two springs 20, two dry cell electrical storage batteries 25, or other electrical power source, two additional springs 27, two clamp sockets 31, two electric lamps 29, and two transparent or translucent end caps 33. The springs 20 are primarily to maintain electrical contact between the bottom pole of each dry cell storage battery, or other power source, and the inside metallic surface of the housing 15, regardless of battery or power source motion within the housing. The batteries 25 provide electrical power for lamp illumination and also provide the weight required to force the batteries, or power source, outward when the housing is rotated.

The outermost springs 27 normally prevent the batteries, or power source, from coming into contact with the lamps 29. When the housing 15 is rotated, however, the centrifugal force resulting from the rotation causes the batteries, or power source, to slide outward within the housing, compressing the springs 27 until the top poles of the batteries 25 contact the bottom contacts of the lamps 29. This completes electrical circuits through the lamps 29, lamp sockets 31, the housing wall 15, the springs 20, and back to the batteries 25, and causes the lamps to illuminate. When the speed of rotation decreases, the springs 27 force the batteries 25 back into their normal positions thereby breaking the electrical circuits. By varying the length or strength of the springs, 27 or 20, or the weight of the batteries 25, the centrifugal force, and, therefore, the rotary speed required to bring the batteries into contact with the lamps also can be varied and pre-determined.

The electrically conductive lamp sockets 31 are in constant contact with the housing wall, being held in place by transparent or translucent caps 33 which are secured to opposite ends of the housing 15 by means of threads 16 or similar attachment devices.

The arrangement of components within the housing is more clearly shown in FIGURE 2, an exploded view of one-half of the housing along with its contents. This half of the housing and components, as previously mentioned, is identical to the other half, the housing 15, pivot hole 18, and spacer block 19 being common to both halves.

In the event that a plastic or non-conductive material is used for the housing, an electrical path from the lamp sockets 31, back to the springs 20, is established either by the use of a conductive coating on the inside surface of the housing or by the use of conductive strips or leads between lamp sockets and springs. In the latter event the conductive strips or leads could be attached to the lamp sockets and to the terminal strip 21 of FIGURE 1, which maintains contact at all times with the springs 20. This terminal strip is not required if the housing is of conductive material.

Referring now to FIGURE 3, there is shown an alternative embodiment of the invention, a dual rotating light signal, intended for use on a bicycle or other vehicle. In this embodiment the method of operation is the same as that previously described except that the rotary motion of the housing 15 is provided by a propeller 35 attached to the housing at its midpoint, sharing the shaft 22, so that rotation of the propeller will cause equal rotation of the housing. This rotation can be induced by air or fluid motion relative to the vehicle or can be provided by means of a mechanical connection between the wheels or drive system of the vehicle and the housing. In the latter event the propeller 35 is not required.

The housing 15 shown in FIGURE 3 differs from that in FIGURE 1 in that holes or slots 36 are provided near each end of the housing in line with each other and extending through the wall of the housing. The internal arrangement of components within the housing is the same as that shown in FIGURE 1 except that in FIGURE 3 the lamp sockets 31 and lamps 29 are completely within the housing and do not extend beyond the housing ends. The lamp sockets are held within the housing, against the springs 27, by transparent or translucent hollow cylinders 38 which are, in turn, held within the housing by non-transparent or non-translucent end caps 40 which close the ends of the housing.

When the lamps within the housing shown in FIGURE 3 illuminate as the result of housing rotation, light is transmitted from the lamps, through the hollow cylinders 38 and through the slots or holes 36. These slots or holes are provided so that the light will be emitted in one direction only and will not radiate in all directions, thereby distracting the driver of the vehicle on which this embodiment of the invention is used. Various colored light can be provided by using transparent or translucent cylinders 38 of different colors.

An alternate embodiment of the invention as depicted in FIGURE 3 would be to construct the housing 15 itself in the form of a hollow propeller but in such a manner that the internal configuration of the propeller would permit functioning of the internal components as previously described.

FIGURE 4 presents a means of fastening the embodiment shown in FIGURE 3 to a shaft 22. FIGURE 4 also shows a spring wire 14 mounted to the shaft, one end firmly fixed in place and the other end moveable. When the propeller 35 is rotating, the spring wire is in the position shown. When it is desired to prevent the propeller from rotating, this can be done by releasing the free end of the spring wire and allowing it to protrude into the path of propeller rotation. Washers 43 and a lock-nut 45 are provided as side load bearings and as a means of securing the propeller onto the shaft.

The foregoing description and the accompanying drawings are considered as examples only since many other designs and applications, all using the same forces and principles, are possible. Such other designs and applications would fall within the scope of this invention as claimed.

What is now claimed as new is as follows:

1. An electro-mechanical device comprising a hollow tube or cylinder, of an electrically conductive material, free to rotate about its axis midway between the two ends, two electrically conductive springs within the tube, one on each side of the aforesaid axis, a portion of each spring at all times being in contact with the tube wall, two electric dry cell storage batteries within the tube, the bottom pole of each battery at all times being in contact with one of the aforesaid springs, two additional springs within the tube, each spring being disposed at the opposite end of one of the batteries in such a manner that the springs do not at any time come into contact with the upper pole of either battery, two lamp sockets of a conductive material, one lamp socket at each end of the tube and in constant contact with the tube wall, two electric lamps, one in each lamp socket, the bottom contact of the lamp extending through and below the lamp socket but being separated from the batteries by the aforesaid springs, two transparent or translucent end caps, one at each end of the tube and secured firmly to the tube thus holding the aforesaid lamp sockets in contact with the tube, whereby rotation of the tube about its axis will cause the batteries to move outward within the tube until the top pole of each battery comes into contact with the bottom contact of its respective lamp thereby completing the electrical circuits and causing the lamps to illuminate.

2. An electro-mechanical device as defined in claim 1 in which centrifugal force is used to bring dry cell storage batteries into contact with electric lamps thereby completing electrical circuits and causing the lamps to illuminate.

3. An electro-mechanical device as defined in claim 2 in which dry cell storage batteries are used not only as sources of electrical power but also as mass and weight required to produce, in combination with rotary motion, sufficient centrifugal force to move the batteries into contact with electric lamps thereby causing the lamps to illuminate.

4. An electro-mechanical device as defined in claim 3 in which springs are used to prevent dry cell storage batteries from making contact with electric lamps until sufficient centrifugal force is developed to overcome the spring force thereby allowing the batteries to move into contact with the lamps.

5. An electro-mechanical device as defined in claim 4 in which electric dry cell storage batteries of known weight exert a force, resulting from rotation, against calibrated springs until the springs are compressed sufficiently to allow contact between batteries and electric lamps thereby resulting in illumination of the lamps and the detection of a pre-selected rotary speed.

6. An electro-mechanical device as defined in claim 5 in which the rotational speed at which electric lamps will illuminate can be varied by changing the weight of the batteries by changing their position with respect to the axis of rotation, i.e., lengthening or shortening the moment arm, by changing the length of the outermost springs, by changing the strength of the outermost springs, or by changing the position of the lamps in relation to the batteries and outermost springs.

7. An electro-mechanical device as defined in claim 6 in which rotational motion of the tube will cause electric lamps in or near the ends of the tube to illuminate and remain illuminated until the rotational motion has slowed down to a point where centrifugal force will be insufficient to maintain contact between batteries and electric lamps.

8. An electro-mechanical device as defined in claim 7 in which electrically conductive springs are used to maintain electrical continuity between terminals of moving batteries and other portions of the device's electrical circuitry.

9. An electro-mechanical device as defined in claim 8 in which the tube or cylinder is of a non-conductive material and a substitute electrical path such as a conductive coating on the internal surface of the tube or electrical leads are used to complete the circuits from the lamp sockets to the bottom poles of the batteries.

10. An electro-mechanical device as defined in claim 9 in which the lamps and attendant light radiation devices are spaced at unequal distances from the axis of rotation so that more than one circle of light will be visible.

11. An electro-mechanical device comprising a hollow tube or cylinder, of an electrically conductive material, free to rotate about its axis midway between its two ends, two electrically conductive springs within the tube, one on each side of the aforesaid axis, a portion of each spring at all times being in contact with the tube wall, two electric dry cell storage batteries within the tube, the bottom pole of each battery at all times maintaining contact with one of the aforesaid springs, two additional springs within the tube, each spring being disposed at the opposite end of one of the batteries in such a manner that the springs do not at any time come into contact with the upper pole of either battery, two lamp sockets of a conductive material, one lamp socket near each end of the tube and in constant contact with the tube wall, two electric lamps, one in each lamp socket, the bottom contact of each lamp extending through and below the lamp socket but being separated from the batteries by the aforesaid springs, two transparent or translucent hollow cylinders within the tube, one at each end, the inboard end of each cylinder resting on the surface of a lamp socket and the body of each cylinder enclosing one of the lamps, two opaque end caps, one at each end of the tube and secured firmly to the tube thus holding the aforesaid cylinders within the tube, two slots through one wall of the tube, the slots being in line with each other, one slot being placed at each end of the tube so that light from the lamps within the tube will be transmitted through the surrounding cylinders and then will be emitted through the slots, one propeller or similar aerodynamic device firmly secured to the tube so that the rotational axis of the propeller will be the same rotational axis as that of the tube, one shaft passing through tube and propeller co-incident with the rotational axis, whereby air or fluid motion relative to the propeller will cause propeller and tube to rotate thus causing the batteries within the tube to move outward until the top poles of the batteries come into contact with the bottom contacts of the lamps thereby completing the electrical circuits and causing the lamps to illuminate.

12. An electro-mechanical device as defined in claim 11 in which light from electric lamps within a rotating tube is directed through slots in the wall of the tube and in which the color of the light emitted through these slots can be changed by use of transparent or translucent cylinders of different colors covering the slots.

13. An electro-mechanical device as defined in claim 12 in which a propeller is mechanically connected to a tube so that rotary motion of the propeller results in equal rotary motion of the tube.

14. An electro-mechanical device as defined in claim 13 in which a spring wire is attached to the shaft or mounting bracketry of the device so that rotary motion of the device can be halted or prevented by projecting the wire into the path of propeller rotation.

15. An electro-mechanical device as defined in claim 14 in which the tube's external geometry is in the form of a propeller thereby eliminating the need for an additional propeller.

References Cited in the file of this patent

UNITED STATES PATENTS

| | | |
|---|---|---|
| 832,600 | Dahl | Oct. 9, 1906 |
| 925,312 | Downer | June 15, 1909 |
| 2,082,778 | Brown | June 8, 1937 |
| 2,611,995 | Krapp | Sept. 30, 1952 |
| 2,868,916 | Neuworth et al. | Jan. 13, 1959 |

FOREIGN PATENTS

| | | |
|---|---|---|
| 277,681 | Great Britain | Sept. 15, 1927 |
| 528,000 | Great Britain | Oct. 21, 1940 |
| 627,239 | France | Sept. 29, 1927 |